(12) United States Patent
Chaudhary et al.

(10) Patent No.: US 11,748,306 B1
(45) Date of Patent: Sep. 5, 2023

(54) DISTRIBUTED DATA CLASSIFICATION

(71) Applicant: Veritas Technologies LLC, Mountain View, CA (US)

(72) Inventors: Abhishek Sureshchandra Chaudhary, Kalyan (IN); Muthukannan Murugappan, Trichy (IN); Parag V. Thakur, Pune (IN)

(73) Assignee: Veritas Technologies LLC, Santa Clara, CA (US)

( * ) Notice: Subject to any disclaimer, the term of this patent is extended or adjusted under 35 U.S.C. 154(b) by 522 days.

(21) Appl. No.: 15/826,814

(22) Filed: Nov. 30, 2017

(51) Int. Cl.
*G06F 16/17* (2019.01)
*G06F 16/13* (2019.01)
*G06F 16/182* (2019.01)

(52) U.S. Cl.
CPC .......... *G06F 16/1734* (2019.01); *G06F 16/13* (2019.01); *G06F 16/183* (2019.01)

(58) Field of Classification Search
CPC ...... G06F 16/1734; G06F 16/183; G06F 16/13
See application file for complete search history.

(56) References Cited

U.S. PATENT DOCUMENTS

| | | | | |
|---|---|---|---|---|
| 8,117,464 | B1* | 2/2012 | Kogelnik | H04L 63/0428 713/193 |
| 9,171,253 | B1* | 10/2015 | Wright et al. | G06N 5/02 |
| 2007/0050361 | A1* | 3/2007 | Al-Masri | G06F 16/16 |
| 2007/0094600 | A1* | 4/2007 | Sullivan et al. | G06F 16/168 715/711 |
| 2010/0162251 | A1* | 6/2010 | Richards et al. | G06F 16/2453 718/102 |
| 2011/0276964 | A1* | 11/2011 | Ogawa et al. | G06F 13/385 718/1 |
| 2013/0061284 | A1* | 3/2013 | Berengoltz et al. | G06F 21/51 726/1 |
| 2013/0204975 | A1* | 8/2013 | Keith, Jr. | H04L 63/10 709/219 |
| 2014/0280472 | A1* | 9/2014 | Riviello et al. | H04L 67/02 709/203 |
| 2017/0118282 | A1* | 4/2017 | Lee et al. | H04L 67/1097 |
| 2017/0140297 | A1* | 5/2017 | Karumanchi et al. | G06Q 10/063 |
| 2017/0149690 | A1* | 5/2017 | Le Rudulier et al. | H04L 43/0817 |

* cited by examiner

*Primary Examiner* — Mark D Featherstone
*Assistant Examiner* — Tony Wu
(74) *Attorney, Agent, or Firm* — WOMBLE BOND DICKINSON (US) LLP

(57) ABSTRACT

Disclosed herein are methods, systems, and processes for source side classification of five and active data. Operating system calls associated with files being accessed or files recently accessed by an endpoint computing device are intercepted. A list including the files is generated and sent to a server computing device. A confirmation is received that a request to classify the files has been received from the server computing device.

17 Claims, 9 Drawing Sheets

DISTRIBUTED DATA CLASSIFICATION

FIELD OF THE DISCLOSURE

This disclosure relates to data management and classification. In particular, this disclosure relates to source side classification of live and active data.

DESCRIPTION OF THE RELATED ART

Modern enterprises routinely face the need to manage and analyze large amounts of data. Data management can be accomplished by classifying data. Data classification involves identifying the type and location of data, and implementing access and protection levels for data. Data classification facilitates a bridge between information technology (IT) professionals and process, device, and/or application owners, and is particularly important for risk management, legal discovery, and compliance with regulations.

Although IT professionals can utilize several tools to perform data classification, data classification is a manually laborious process, implemented and managed by external and/or remote persons and/or entities (e.g., by performing data mining, and other such activities). Such data classification activities are customarily performed by IT administrators and/or IT professionals who typically do not (and are not expected to) possess knowledge and/or information about the importance and/or priority of the data being classified.

Businesses and organizations face several challenges with respect to gaining visibility and insight into their fastest growing data - unstructured data. This type of data — including emails, documents, image files, and the like, can expose enterprises to potentially harmful security vulnerabilities and unintended leaks of personally identifiable information (PII). Therefore, active users of live data are typically in the best position to approve and perform data classification activities if and when such data is accessed (e.g., at a source and/or locally). Unfortunately, depending and/or counting on IT administrators to remotely classify such important data is undesirable and computing resource intensive.

SUMMARY OF THE DISCLOSURE

Disclosed herein are methods, systems, and processes for source side classification of live and active data. Once such method involves intercepting operating system calls associated with files being accessed or files recently accessed by an endpoint computing device, generating a list including the files, sending the list including the files to a server computing device, and receiving confirmation that a request to classify the files has been received from the server computing device.

In certain embodiments, the request to classify the files is based on a last time the one or more files were edited by the endpoint computing device, whether the files are accessible by the endpoint computing device, the list comprising the files, or another list including the files provided to the endpoint computing device by the server computing device.

In some embodiments, the method determines that the request to classify the one or more files will cause deterioration in performance of the endpoint computing device, and inhibits and/or delays performance of the request to classify the files on the endpoint computing device. In other embodiments, the method determines that endpoint computing device is idle based on a user history or a geolocation of the endpoint computing device, and performs the request to classify the files.

In one embodiment, intercepting the operating system calls includes accessing a kernel of the operating system, monitoring a file system associated with the operating system, identifying network events associated with the endpoint computing device, and identifying the files. In another embodiment, the request to classify the files includes benchmarks associated with a user of the endpoint computing device, and the benchmarks are associated with an employee level in an active directory, a peer of the user in the active directory, a business unit of the user, or a peer organization of the user.

In certain embodiments, the request to classify the files is generated by a file classification manager executing on the server computing device, the list including the files is generated by a file classification engine executed by the endpoint computing device, and the files are temporarily stored on a local storage device or a memory associated with the endpoint computing device and permanently stored on a remote storage device.

The foregoing is a summary and thus contains, by necessity, simplifications, generalizations and omissions of detail; consequently those skilled in the art will appreciate that the summary is illustrative only and is not intended to be in any limiting. Other aspects, features, and advantages of the present disclosure, as defined solely by the claims, will become apparent in the non-limiting detailed description set forth below.

BRIEF DESCRIPTION OF THE DRAWINGS

The present disclosure may be better understood, and its numerous objects and features made apparent to those skilled in the art, by referencing the accompanying drawings.

Figure 1:
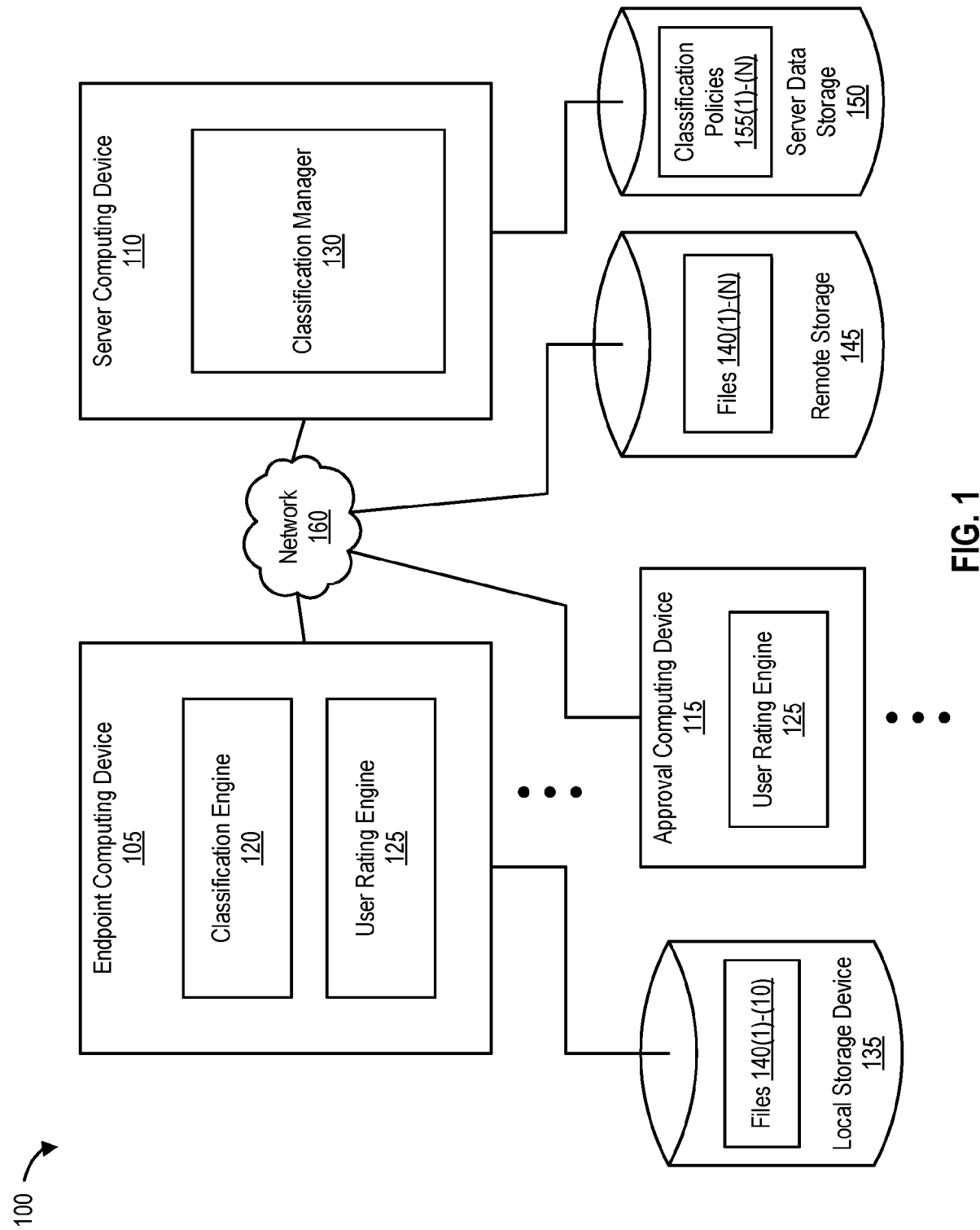
FIG. 1 is a block diagram 100 of a source side data classification computing system, according to one embodiment of the present disclosure.

While the disclosure is susceptible to various modifications and alternative forms, specific embodiments of the disclosure are provided as examples in the drawings and detailed description. It should be understood that the drawings and detailed description are not intended to limit the disclosure to the particular form disclosed. Instead, the intention is to cover all modifications, equivalents and alternatives falling within the spirit and scope of the disclosure as defined by the appended claims.

DETAILED DESCRIPTION

Introduction

Data classification is a process implemented to organize data by relevant categories so that the data can be used and protected more efficiently. Data classification not only makes it easier to locate and retrieve data, but is also of particular importance when it comes to risk management, compliance, and data security. For example, businesses and organizations classify their data for data security initiatives, ease of access, electronic discovery, compliance with regulatory requirements, and to meet various other business and/or corporate objectives. For regulatory requirement cases, data classification permits requested data to be searchable and retrievable with specified timeframes, whereas for data security purposes, data classification facilitates the implementation of proper security responses based on the type of data being retrieved, transmitted, and/or copied.

Data classification often involves a multitude of tags, labels, and other such identifiers of data that define the type of data (e.g., the confidentiality of the data, and the like). For example, modern businesses and organizations classify data based on the sensitivity, importance, and/or confidentiality of the data, and can implement security measures to protect each classification (e.g., restricted, private, public, and the like). For example, public data represents the least sensitive data with the lowest security requirements, whereas restricted and/or sensitive data garners the highest security classification. In this manner, data can be identified, tagged, and/or labeled based on relevance, quality, and other such markers.

Data classification can be a complex and cumbersome process, unless systems and procedures are employed to streamline the data classification process. For example, business and organizations need to determine categories and criteria used to classify data, understand and define objectives of such classifications, outline roles and responsibilities of employees in maintaining proper data classification protocols, and implement security standards that adequately correspond with data identifiers to provide a framework for entities involved in the storage, transmission, and/or retrieval of data within which to operate.

For example, data classification policies can be defined to consider security requirements and confidentiality of data types, and promote compliance (e.g., by including information pertaining to categories about the types of data classified, security considerations with rules for retrieving, transmitting, and/or storage data, and the like). In this manner, data classification enables modern enterprises to make sense of vast amounts of data and provides a clear picture of data with an organization's control (e.g., by facilitating and/or encouraging the gathering of information that details where and how data is stored, how, when, why and by who the data is accessed, and how the data is best protected from potential security risks and vulnerabilities). In addition, data classification also provides an organized information framework that facilities data protection measures and promotes employee and organizational compliance with security, regulatory, and/or legal policies.

As previously noted, modern businesses and organizations face challenges with gaining visibility and insight into their fastest growing data - unstructured data. This type of data — including emails, documents, image files, and the like expose enterprises to potentially harmful security vulnerabilities and unintended disclosure of personally identifiable information (PII). Therefore, enterprises face a need to quickly scan and tag data to ensure that sensitive or risky information is properly managed and protected (e.g., to meet compliance requirements that require discrete retention policies be implemented and enforced across an enterprise's entire data estate — regardless of where that data lives).

For example, modern businesses and organizations have to achieve compliance with strict data protection requirements worldwide (e.g., the European Union's General Data Protection Regulation (GDPR), Sarbanes-Oxley, Health Insurance Portability and Accountability Act (HIPPA), regulations pertaining to PII, protecting privileged documents in litigation, and the like). Therefore, data classification is a critical tool for enterprises that need broad visibility into their data, and makes sensitive data easier to find, redundant and stale data easier to delete, and allows enterprises to make informed decisions. However, data classification can be a complex and cumbersome process, unless systems, methods, and processes are employed to optimize the data classification process.

Unfortunately, as noted above, in complex business computing environments, it is not feasible or desirable for an information technology (IT) administrator to classify certain data and/or files. An IT administrator may not be able to identify an important set of files to be classified and/or acted upon, because the IT administrator may not have knowledge of and/or be privy to the internal operations of external business units in an organization (e.g., a sales department in a remote location). For example, the IT administrator may not be able to determine the level of priority and/or confidentiality to attach to a document with confidential sales projections, and the like. In addition, the IT administrator may also face data accessibility issues pertaining to regulations and laws which protect the content of files, preventing the IT administrator from classifying such files (e.g., health records with PII such as social security numbers, sensitive health information, and the like). Therefore, in certain scenarios, IT administrators are not in the best position to classify enterprise data.

Disclosed herein are methods, systems, and processes for distributed data classification. Source side classification of live and active data engages and encourages end users to classify data because such end users (e.g., employees, and the like) are in the best position to classify data at least because of personal knowledge regarding the nature of the data being classified. In addition, the speed and efficiency of data classification is considerably improved because data classification is performed at the source if and when the data is being accessed (e.g., by an end user with personal knowledge of the data being classified), instead of being performed at a later time (e.g., by an uninformed IT administrator).

Example Distributed Data Classification Computing System

FIG. 1 is a block diagram 100 of a source side data classification computing system, according to one embodiment. Such a distributed and/or source side data classification computing system includes at least one or more endpoint computing devices (e.g., endpoint computing device 105), one or more approval computing devices (e.g., approval computing device 115), a local storage device 135, a server computing device 110, a remote storage 145, and a server data storage 150.

Endpoint computing device 105, approval computing device 115, server computing device 110, and remote storage 145 are communicatively coupled via network 160. Endpoint computing device 105, approval computing device 115, and server computing device 110 can be any of a variety of different computing devices, including a server, personal computing device, laptop computer, cellular phone, or the like. Network 160 can be any type of network and/or interconnection (e.g., the Internet, a Wide Area Network (WAN), and the like). Local storage device 135, remote storage 145, and server data storage 150 can include one or more of a variety of different storage devices, including hard disks, compact discs, digital versatile discs, solid state drive (SSD) memory such as Flash memory, and the like, or one or more logical storage devices such as volumes implemented on one or more such physical storage devices.

Endpoint computing device 105 includes at least a classification engine 120 (e.g., a data insight classification engine (DICE)) and a user rating engine 125 (e.g., implemented in the form of a desktop and/or laptop application (Sheriff)), and is communicatively coupled to local storage device 135. Local storage device 135, which can include the memory of endpoint computing device 105, stores files 140(1)-(10), at least temporarily (e.g., while being accessed by endpoint computing device 105). Approval computing device 115, which can be a mobile computing device (e.g., a mobile telephone, a smartphone, a tablet, and the like) also implements user rating engine 125 (e.g., implemented in the form of a mobile application (Sheriff)). Server computing device 110 implements classification manager 130, and is communicatively coupled to server data storage 150 which stores classification policies 155(1)-(N). Remote storage 145, which can be implemented on-premises, in the cloud, and/or as cloud storage service and/or device, stores files 140(1)-(N) (e.g., enterprise data).

Example Source Side Data Insight Classification Engine (DICE)

Figure 2:
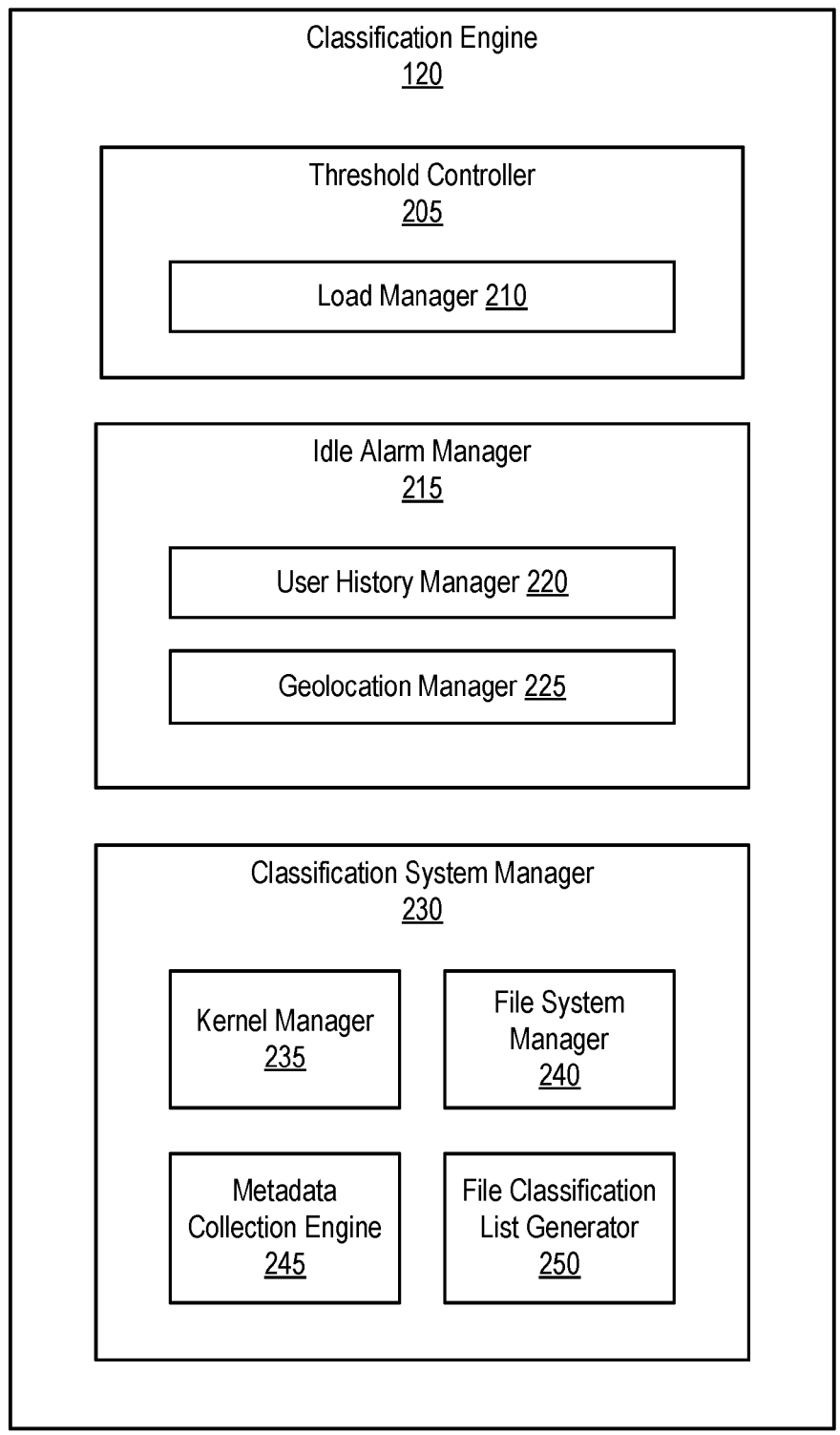
FIG. 2 is a block diagram 200 of a data insight classification engine (DICE), according to one embodiment of the present disclosure.

FIG. 2 is a block diagram 200 of a data insight classification engine (DICE), according to one embodiment. Classification engine 120, which is a source side data classifier of live and active data, can be used to classify a finite set of remote files accessible to a user (e.g., user A) of endpoint computing device 105 and/or approval computing device 115 (e.g., a user-machine pair). Classification engine 120 includes at least a threshold controller 205, an idle alarm manager 215, and a classification system manager 230, and can be implemented on multiple user-machine pairs communicatively coupled to server computing device 110. In one embodiment, classification engine 120 is implemented on endpoint computing device 105, and in conjunction with user rating engine 125, extracts remote files (e.g., remote files 140(1)-(10)), classifies the remote files, and transmits the results of the classification to server computing device 110 (e.g., to classification manager 130 implemented by server computing device 110 as shown in FIG. 1).

In some embodiments, if endpoint computing system 105 is capable of performing data classification (e.g., if endpoint computing system 105 is locked and/or has free cycles, among other considerations), classification engine 120 receives file content, classifies the file content, and sends the outcome of the classification to classification manager 130. In this example, the order in which file content is retrieved and classified is based on the following: last time files 140(1)-(10) were edited by endpoint computing device 105, whether files 140(1)-(10) are accessible by endpoint computing device 105, a list that includes files 140(1)-(10) (e.g., generated by classification engine 120), and/or another list including files 140(1)-(10) (e.g., provided to endpoint computing device 105 by server computing device 110). In addition, classification engine 120 can assign higher precedence and/or priority to files that are locally available on endpoint computing device 105.

As noted, classification engine 120 also implements threshold controller 205, idle alarm manager 215, and classification system manager 230. Threshold controller 205 includes at least a load manager 210 (e.g., to disable source side file scanning and classification if a resultant processing load imposed on endpoint computing device 105 would increase beyond a certain threshold). Idle alarm manager 215 includes at least a user history manager 220 and a geolocation manager 225 (e.g., to determine an ideal and/or best time to start classification engine 120 based on user history, geolocation, and the like). Classification system manager 230 includes at least a kernel manager 235, a file system manager 240, a metadata collection engine 245, and a file classification list generator 250.

In certain embodiments, classification engine 120 intercepts operating system (OS) calls associated with files (e.g., to identify files such as files 140(1)-(10) being accessed or recently accessed by endpoint computing system 105) using kernel manager 235 and file system manager 240, generates a list including the files (e.g., using file classification list generator 250), and sends and/or transmits the list including the files to server computing device 110. For example, classification system manager 230 identifies files recently accessed by endpoint computing device 105 and sends an alert to classification engine 120, kernel manager 235 intercepts OS calls (e.g., in the OS kernel of endpoint computing device 105), file system manager 245 monitors the file system and/or network level events of endpoint computing device 105, metadata collection engine 245 identifies a list of files to be classified (e.g., based on file events), and file classification list generator 250 generates a list of files to be classified at the source (e.g., by endpoint computing device 105).

In some embodiments, endpoint computing device 105 retrieves and/or fetches file content from a remote location (e.g., remote storage 145), and feeds the file content to classification engine 120. To eliminate file content retrieval time to perform data classification, classification engine 120 classifies file content at the source at least because cloud storage providers maintain a local copy of files making source side classification efficient, the OS of endpoint computing device 105 can use the local copy of files to access and classify the file content, and kernel level interceptors (e.g., kernel manager 235) can be used to read temporary files, extract the file content, and perform file classification (e.g., even if a user of endpoint computing device 105 is reading the file content).

In other embodiments, classification engine 120 determines that a request to classify files (e.g., received from server computing device 110 and/or approval computing device 115) will cause deterioration in performance of endpoint computing device 105 (e.g., using threshold controller 205), and inhibits and/or delays performance of the request to classify the files on endpoint computing device 105. If idle alarm manager 215 determines that endpoint computing device 105 is idle (e.g., based on a user history or a geolocation of endpoint computing device 105), classification engine system manager 230 performs the request to classify the files.

Classification system manager 230 implemented by classification engine 120, in conjunction with user rating engine 125 (discussed in association with FIG. 3A), generates one or more lists of files to be classified at the source (e.g., at endpoint computing device 105). For example, kernel manager 235 (e.g., providing kernel level interceptors) intercepts OS calls by accessing the kernel of endpoint computing device 105, file system manager 240 monitors the file system associated with the OS of endpoint computing device 105, metadata collection engine 245 identifies network and/or files events associated with endpoint computing device 105, and file classification generator 250 identifies the files and generates a list of such files. Endpoint computing device 105 then sends the list(s) of files to classification manager 130 implemented by server computing device 105 (discussed in association with FIG. 3B) which has access to classification policies (e.g., classification policies 155(1)-(N) as shown in FIG. 1).

Examples of Facilitating Distributed Data Classification (Sheriff)

Figure 3A:
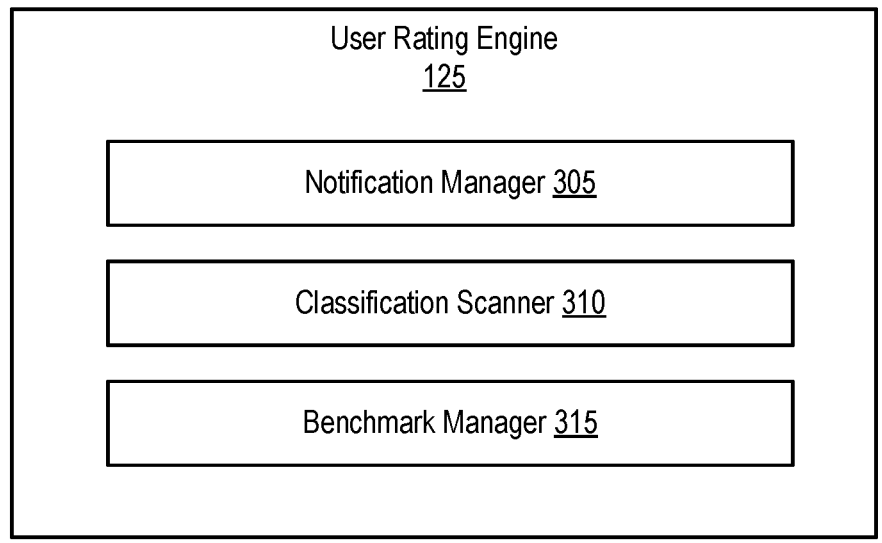
FIG. 3A is a block diagram 300A of a user rating engine (Sheriff) implemented in a source side data classification computing environment, according to one embodiment of the present disclosure.

FIG. 3A is a block diagram 300A of a user rating engine implemented in a source side data classification computing environment (Sheriff), according to one embodiment. User rating engine 125 (e.g., Sheriff), which can be implemented by both endpoint computing device 105 (e.g., as a desktop/laptop application) and/or approval computing device 115 (e.g., as a mobile application), includes at least a notification manager 305, a classification scanner 310, and a benchmark manager 315.

In one embodiment, classification manager 130 and/or server computing device 110 generates a request to classify the files in the list(s) of files sent to classification manager 130 by endpoint computing device 105. In one example, such a source side data classification request can include benchmarks associated with a user of endpoint computing device 105 (e.g., benchmarks associated with an employee level in an active directory, a peer of the user in the active directory, a business unit of the user, or a peer organization of the user). Such benchmarks can be based on classification policies 155(1)-(N), and can be tracked, modified, and/or updated by benchmark manager 315.

In another embodiment, classification engine 120 informs user rating engine 125 in endpoint computing device 105 of one or more file events associated with endpoint computing device 105. On the occurrence of a file event (e.g., add/edit/delete), notification manager 305 marks the file for processing. Classification scanner 310 then adds the file to a list which is then sent to user rating engine 125 in approval computing device 115 (e.g., if and when endpoint computing device 105 has free cycles and/or is locked).

In some embodiments, user rating engine 125 of approval computing device 115 initiates source side and/or distributed data classification based on one or more lists of files provided by the user rating engine of endpoint computing device 105. In these examples, user rating engine 125 provides a pop up (or similar) notification to a user of approval computing device 115 that includes information regarding changes to files and also permits changes to the fist(s). The user can then approve or deny the performance of a source side and/or distributed data classification process on endpoint computing device 105.

Benchmark manger 315 permits a user of endpoint computing device 105 and/or approval computing device 115 to check his or her data classification progress with other users in the same organization (e.g., employees in the same department, employees who have the same manager, and the like). In one embodiment, user rating engine 125 retrieves data from an active directory (e.g., data pertaining to an employee's manager, designation, experience, start date, and the like, to identify the user's direct peers). However, it should be noted that a user grouping can be expanded, is not bound to an active directory, and can be based on a single attribute or multiple attributes. In some embodiments, benchmark manager 315 also monitors and determines the average of data that is classified for a group (e.g., the number of files), and sets and/or assigns the average value as a benchmark. In other embodiments, notification manager 305 displays trend data to the user that permits the user to understand and act upon data classification trends (e.g., group level targets for a specified period of time within his/her department, and the like). In this manner, user rating engine 125 permits active and/or live users of data to perform distributed data classification at the source while endpoint computing device 105 is idle and/or is at rest.

In certain embodiments, user rating engine 125 functions as a scheduler for classification engine 120, permits time effective data classification at the source where files are accessed live, and maintains classification metadata associated with the files (e.g., to collect analytical data regarding the overall classification environment). In addition, a scan of files for data classification purposes by classification scanner 310 shifts a benchmark value generated by benchmark manager 315 by a proven achievable number for other users who may have not initiated data classification on their endpoint computing devices. In this example, such benchmarks can be based on a user's level and/or peer in active directory, as well as the user's business unit(s) and/or peer organization(s), and the like.

Figure 3B:
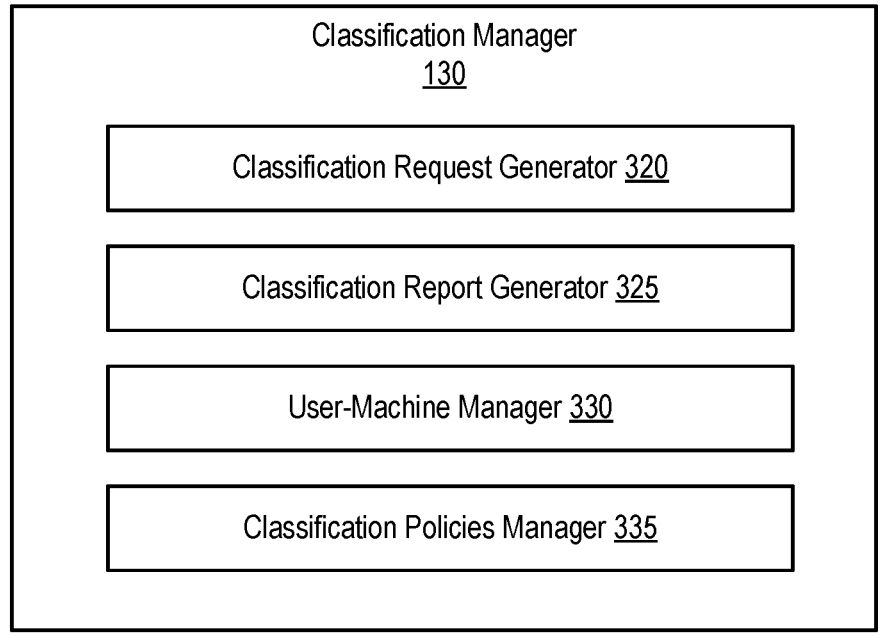
FIG. 3B is a block diagram 300B of a file classification manager, according to one embodiment of the present disclosure.

FIG. 3B is a block diagram 300B of a file classification manager, according to one embodiment. Classification manager 130, implemented by server computing device 105, includes at least a classification request generator 320, a classification report generator 325, a user-machine manager 330, and a classification policies manager 335. As previously noted, endpoint computing device 105 sends one or more list(s) of files identified by classification engine 120 and/or user rating engine 125 to classification manager 130. In one embodiment, because classification manager 130 has access to classification policies 155(1)-(N) stored in server data storage 150, classification request generator 320 generates a data classification request based on one or more classification policies provided by classification policies manager 335 (e.g., based on pre-configured patterns for recognition of credit card and social security numbers, medical records, documents with PII, and the like, or different classification policies for GDPR, HIPAA, and the like).

In other embodiments, user-machine manager 330 ensures that source side distributed data classification requests (e.g., one or more list(s) of files to be acted upon by one or more user-machine pairs) are sent to the appropriate user(s) of approval computing device(s) and endpoint computing device(s), and classification report generator 325 generates a report of file(s) and/or data classified by various user-machine pairs, in addition to benchmark values, progress markers, superior classification methods, leader boards, and the like, to encourage and facilitate time effective source side data classification in enterprise computing environments.

Example Processes to Perform Distributed Data Classification

Figure 4:
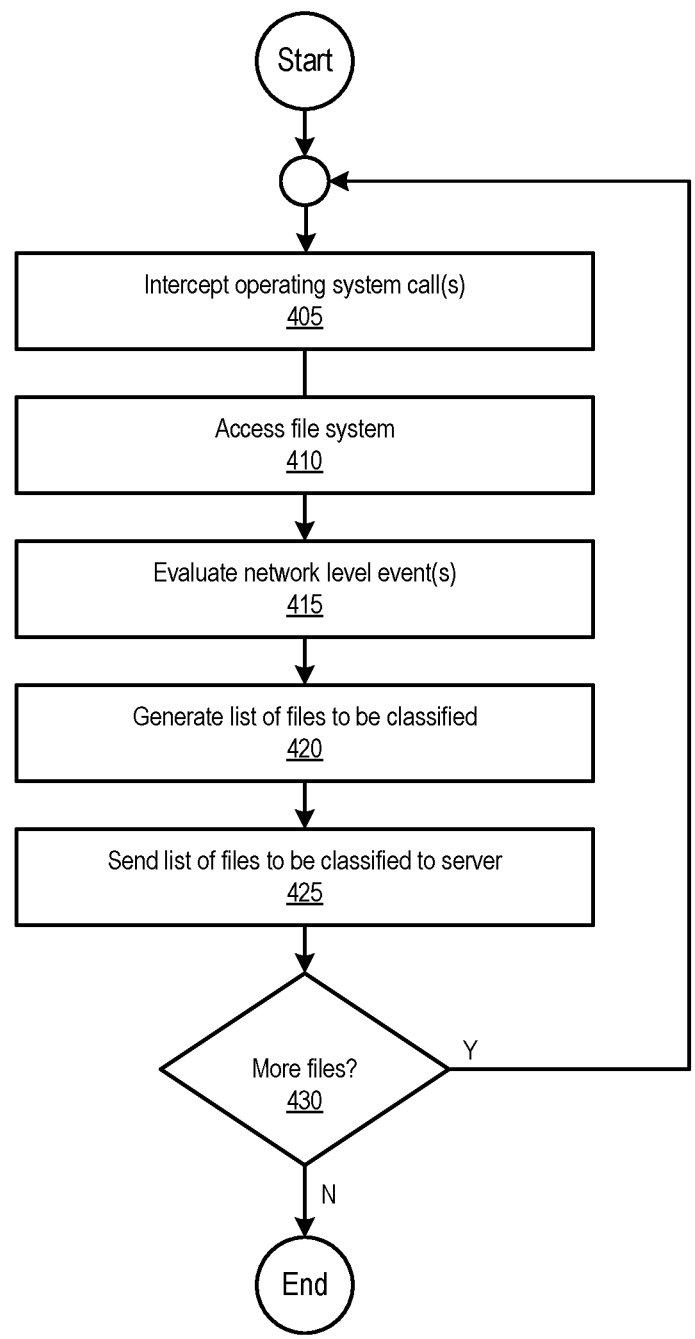
FIG. 4 is a flowchart 400 of a process for generating a list of files to be classified at an endpoint, according to one embodiment of the present disclosure.

FIG. 4 is a flowchart 400 of a process for generating a list of files to be classified at an endpoint, according to one embodiment. The process begins at 405 by intercepting operating system (OS) calls (e.g., using kernel manager 235). At 410, the process access a file system (e.g., file system of endpoint computing device 105 using file system manager 240), and at 415, evaluates network level event(s) (e.g., one or more file events associated with files 140(1)-(10) such as add, edit, delete, and the like). At 420, the process generates a list of files to be classified locally and/or at the source (e.g., using file classification list generator 250 and/or user rating manager 125), and at 425, sends (e.g., transmits and/or pushes) the list of files to a server (e.g., server computing device 110). At 430, the process determines if there are more files to be classified (e.g., using classification scanner 310). If there are more files to be classified (e.g., new live and/or active), the process loops to 405. Otherwise, the process ends.

Figure 5:
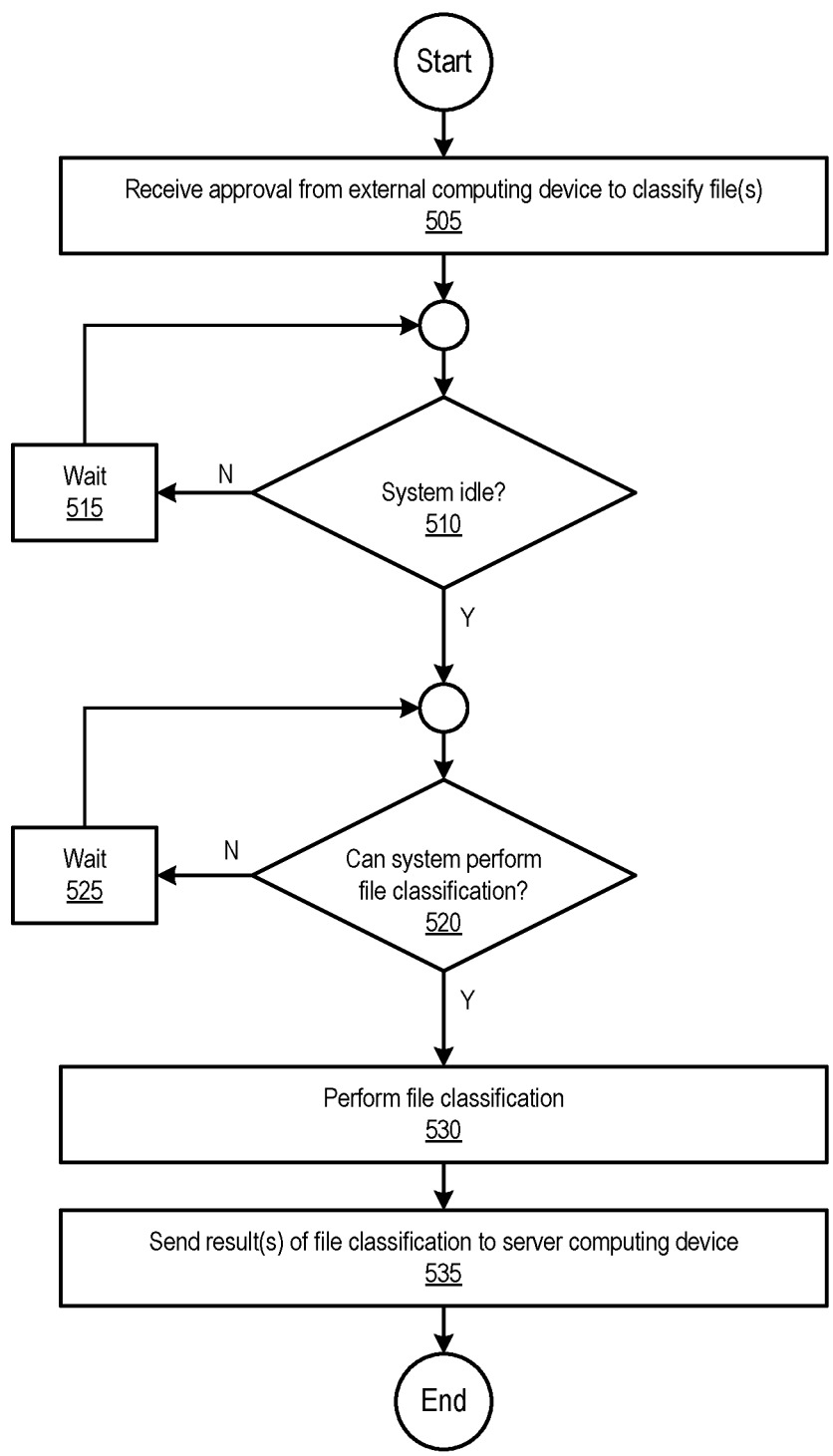
FIG. 5 is a flowchart 500 of a process for source side classification of live and active data, according to one embodiment of the present disclosure.

FIG. 5 is a flowchart 500 of a process for source side classification of live and active data, according to one embodiment. The process begins at 505 by receiving approval from an external computing device (e.g., approval computing device 115) to classify files. For example, user rating engine 125 implemented by approval computing device 115 can generate a pop up notification urging the user of approval computing device 115 to initiate and/or start the classification of file content identified by endpoint computing device 105 (e.g., by user rating engine 125 and/or classification engine 120 of endpoint computing device 105).

At 510, the process determines if endpoint computing device 105 is idle (e.g., using idle alarm manager 215). If endpoint computing device 105 is not idle, at 515, the process waits. However, if endpoint computing device 105 is idle, the process, at 520, determines whether endpoint computing device 105 can perform file classification (e.g., using threshold controller 205). If endpoint computing device 105 cannot perform file classification, at 525, the process waits. However, if endpoint computing device 105 can perform file classification, at 530, the process performs file classification (e.g., using classification engine 120). The process ends at 535 by sending the results of file classification to server computing device 110.

Figure 6:
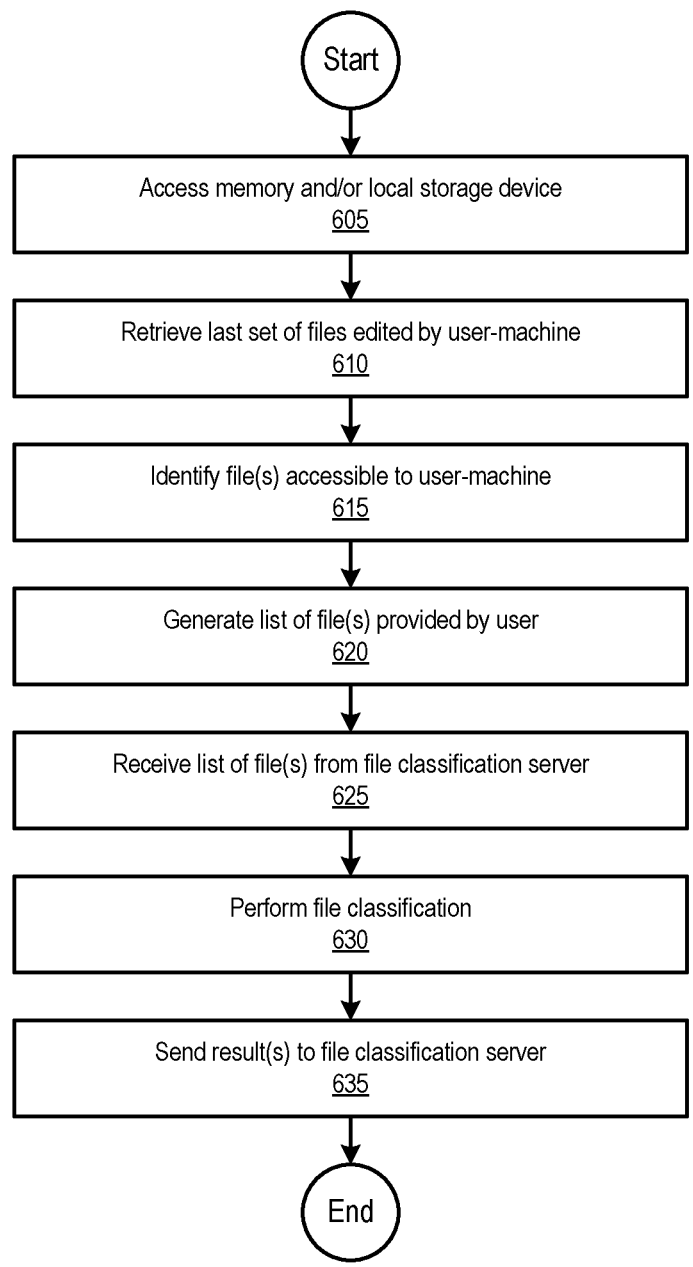
FIG. 6 is a flowchart 600 of a process for performing file classification at an endpoint, according to one embodiment of the present disclosure.

FIG. 6 is a flowchart 600 of a process for performing file classification at an endpoint, according to one embodiment. The process begins at 605 by accessing memory and/or a local storage device (e.g., memory and/or a local storage device associated with endpoint computing device 105). At 610, the process retrieves a last set of files edited by a user-machine (e.g., one or more of files 140(1)-(10) edited by endpoint computing device 105), and at 615, identifies files accessible to the user-machine (e.g., files 140(1)-(10) stored in local storage device 135 communicatively coupled to endpoint computing device 105 and accessible to endpoint computing device 105).

At 620, the process generates a list of files provided by a user of endpoint computing device 105 (e.g., files with PII identified and tagged by the user), at 625, receives a list of files (e.g., important corporate files currently being accessed by the user) from a file classification server (e.g., server computing device 110), and at 630, performs file classification (e.g., using classification engine 120 in conjunction with user rating engine 125). The process ends at 635 by sending results (of the file classification) to the file classification server (e.g., to server computing device 110 for report generation purposes, and the like).

Figure 7:
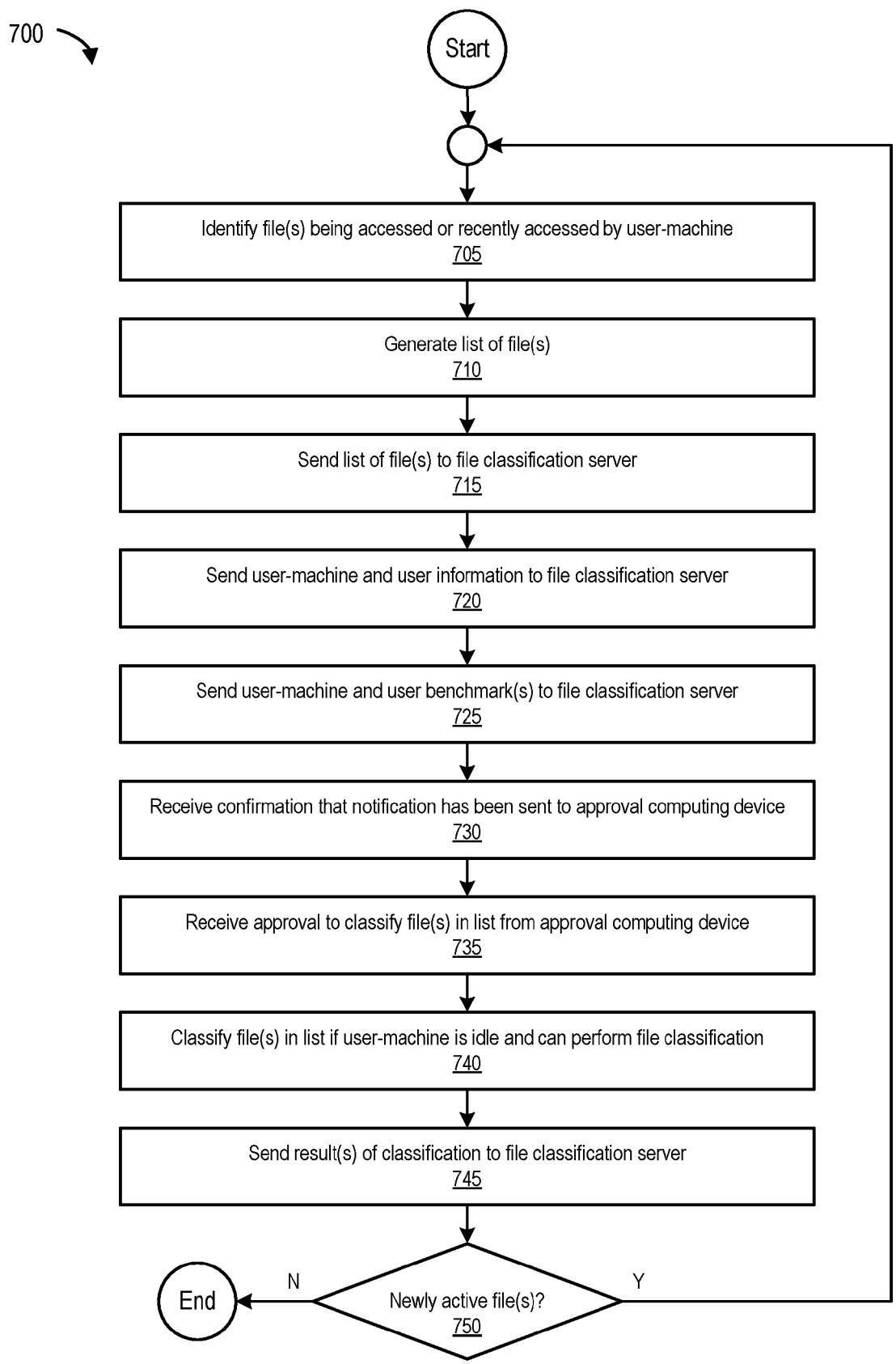
FIG. 7 is a flowchart 700 of a process for distributed file classification, according to one embodiment of the present disclosure.

FIG. 7 is a flowchart 700 of a process for distributed file classification, according to one embodiment. The process begins at 705 by identifying files being accessed or recently accessed by a user-machine (e.g., local copies of cloud-stored files, temporary files read by kernel level interceptors to extract file content depending on file type, size, and the like). At 710, the process generates a list of files (e.g., using file classification list generator 250), and at 715, sends the list of files to a file classification server (e.g., to classification manager 130). At 720, the process sends user-machine and user information to the file classification server (e.g., user A of endpoint computing device 105 and approval computing device 115), and at 725, sends user-machine and user benchmarks to the file classification server (e.g., benchmark values for data classification to be performed by user A of endpoint computing device 105 as determined by benchmark manager 315). Classification manger 130 then generates a source side classification request for the files in the list(s) identified based on benchmark values assigned to the file content and/or one or more classification policies applicable to the files in the fist(s).

At 730, the process receives a confirmation that a notification (to classify files) has been sent to and received by approval computing device 115 (e.g., sent from endpoint computing device 105 and/or server computing device 110). At 735, the process receives approval to classify files in one or more lists (e.g., using classification engine 120 implemented locally by endpoint computing device 105) from approval computing device 115. At 740, the process classifies files if the user-machine is idle (e.g., locked by user A of endpoint computing device 105) and can perform file classification (e.g., without causing deterioration in system performance of endpoint computing device 105), and at 745, sends results of the classification to the file classification server. At 750, the process determines if there are newly active files. If there are newly active files, the process loops to 705. Otherwise, the process ends.

It will be appreciated that the systems, methods, and processes described herein at least perform distributed data classification, significantly improve the pace and efficacy of data classification, encourage and facilitate source side data classification, and/or reduce network traffic and bandwidth usage in enterprise computing environments.

Example Computing Environment

Figure 8:
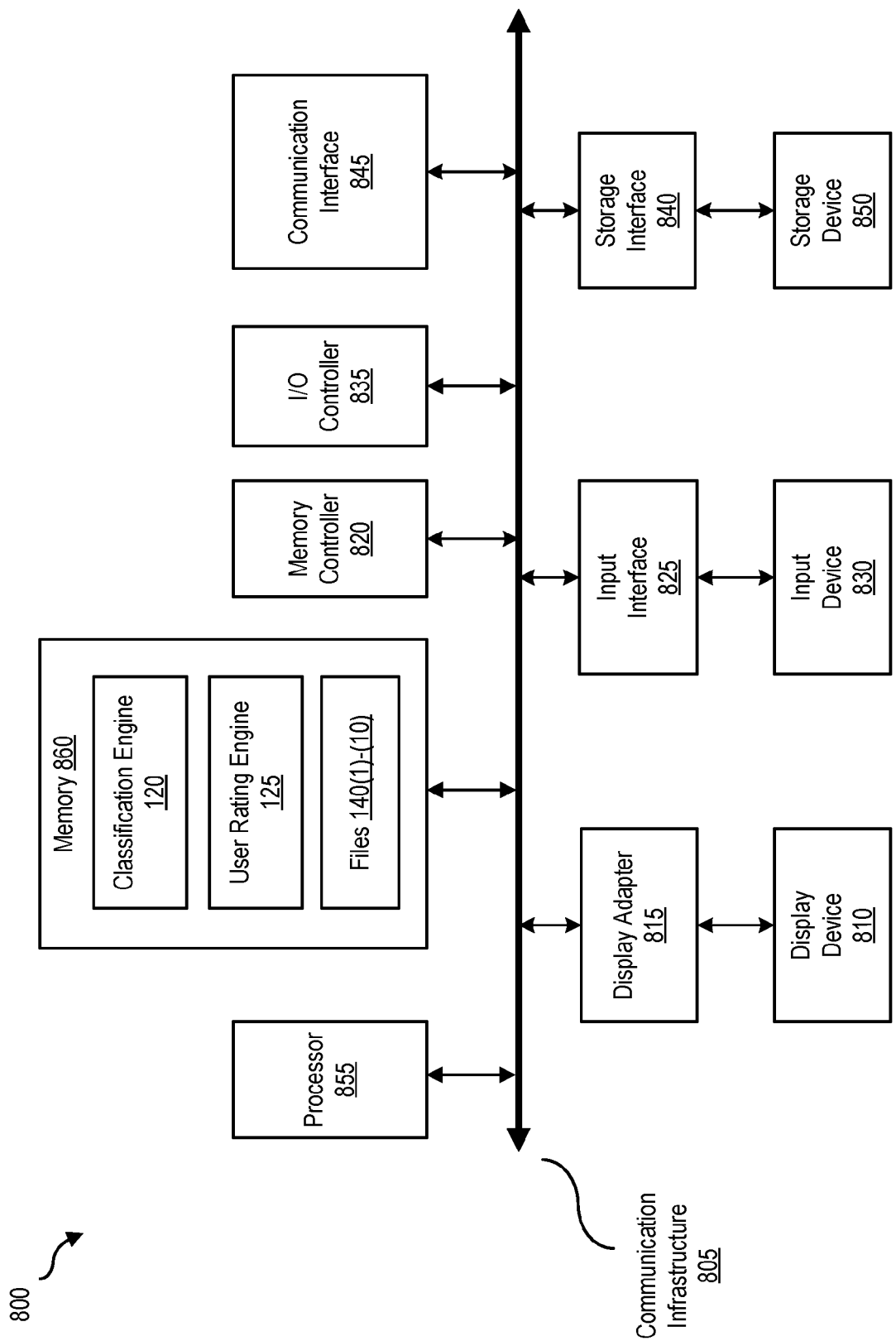
FIG. 8 is a block diagram 800 of a distributed file classification computing system, according to one embodiment of the present disclosure.

FIG. 8 is a block diagram of a computing system 800, according to one embodiment of the present disclosure. Computing system 800 can include endpoint computing device 105 and broadly represents any single or multi-processor computing device or system capable of executing computer-readable instructions. Examples of computing system 800 include, without limitation, any one or more of a variety of devices including workstations, personal computers, laptops, client-side terminals, servers, distributed computing systems, handheld devices (e.g., personal digital assistants and mobile phones), network appliances, storage controllers (e.g., array controllers, tape drive controller, or hard drive controller), and the like. In its most basic configuration, computing system 800 may include at least one processor 855 and a memory 860. By executing the software that executes classification engine 120 and/or user rating engine 125, computing system 800 becomes a special purpose computing device that is configured to perform distributed data classification.

Processor 855 generally represents any type or form of processing unit capable of processing data or interpreting and executing instructions. In certain embodiments, processor 855 may receive instructions from a software application or module. These instructions may cause processor 855 to perform the functions of one or more of the embodiments described and/or illustrated herein. For example, processor 855 may perform and/or be a means for performing all or some of the operations described herein. Processor 855 may also perform and/or be a means for performing any other operations, methods, or processes described and/or illustrated herein. Memory 860 generally represents any type or form of volatile or non-volatile storage devices or mediums capable of storing data and/or other computer-readable instructions. Examples include, without limitation, random access memory (RAM), read only memory (ROM), flash memory, or any other suitable memory device. Although not required, in certain embodiments computing system 800 may include both a volatile memory unit and a non-volatile storage device. In one example, program instructions implementing classification engine 120 and/or user rating engine 125 may be loaded into memory 860.

Computing system 800 may also include one or more components or elements in addition to processor 855 and/or memory 860. For example, as illustrated in FIG. 8, computing system 800 may include a memory controller 820, an Input/Output (I/O) controller 835, and a communication interface 845, each of which may be interconnected via a communication infrastructure 805. Communication infrastructure 805 generally represents any type or form of infrastructure capable of facilitating communication between one or more components of a computing device. Examples of communication infrastructure 805 include, without limitation, a communication bus (such as an Industry Standard Architecture (ISA), Peripheral Component Interconnect (PCI), PCI express (PCIe), or similar bus) and a network.

Memory controller 820 generally represents any type/form of device capable of handling memory or data or controlling communication between one or more components of computing system 800. In certain embodiments memory controller 820 may control communication between processor 855, memory 860, and I/O controller 835 via communication infrastructure 805. In certain embodiments, memory controller 820 may perform and/or be a means for performing, either alone or in combination with other elements, one or more of the operations or features described and/or illustrated herein.

I/O controller 835 generally represents any type or form of module capable of coordinating and/or controlling the input and output functions of a virtual machine and/or a physical computing device. I/O controller 835 may control or facilitate transfer of data between one or more elements of computing system 800, such as processor 855, memory 860, communication interface 845, display adapter 815, input interface 825, and storage interface 840.

Communication interface 845 broadly represents any type or form of communication device or adapter capable of facilitating communication between computing system 800 and one or more other devices. Communication interface 845 may facilitate communication between computing system 800 and a private or public network including additional computing systems. Examples of communication interface 845 include, without limitation, a wired network interface (such as a network interface card), a wireless network interface (such as a wireless network interface card), a modem, and any other suitable interface. Communication interface 845 may provide a direct connection to a remote server via a direct link to a network, such as the Internet, and may also indirectly provide such a connection through, for example, a local area network (e.g., an Ethernet network), a personal area network, a telephone or cable network, a cellular telephone connection, a satellite data connection, or any other suitable connection.

Communication interface 845 may also represent a host adapter configured to facilitate communication between computing system 800 and one or more additional network or storage devices via an external bus or communications channel. Examples of host adapters include, Small Computer System Interface (SCSI) host adapters, Universal Serial Bus (USB) host adapters, Institute of Electrical and Electronics Engineers (IEEE) 1394 host adapters, Serial Advanced Technology Attachment (SATA), Serial Attached SCSI (SAS), and external SATA (eSATA) host adapters, Advanced Technology Attachment (ATA) and Parallel ATA (PATA) host adapters, Fibre Channel interface adapters, Ethernet adapters, or the like. Communication interface 845 may also allow computing system 800 to engage in distributed or remote computing (e.g., by receiving/sending instructions to/from a remote device for execution).

As illustrated in FIG. 8, computing system 800 may also include at least one display device 810 coupled to communication infrastructure 805 via a display adapter 815. Display device 810 generally represents any type or form of device capable of visually displaying information forwarded by display adapter 815 (e.g., in a GUI). Similarly, display adapter 815 generally represents any type or form of device configured to forward graphics, text, and other data from communication infrastructure 805 (or from a frame buffer, as known in the art) for display on display device 810. Computing system 800 may also include at least one input device 830 coupled to communication infrastructure 805 via an input interface 825. Input device 830 generally represents any type or form of input device capable of providing input, either computer or human generated, to computing system 800. Examples of input device 830 include a keyboard, a pointing device, a speech recognition device, or any other input device.

Computing system 800 may also include storage device 850 coupled to communication infrastructure 805 via a storage interface 840. Storage device 850 generally represents any type or form of storage devices or mediums capable of storing data and/or other computer-readable instructions. For example, storage device 850 may include a magnetic disk drive (e.g., a so-called hard drive), a floppy disk drive, a magnetic tape drive, an optical disk drive, a flash drive, or the like. Storage interface 840 generally represents any type or form of interface or device for transferring and/or or transmitting data between storage device 850, and other components of computing system 800. Storage device 850 may be configured to read from and/or write to a removable storage unit configured to store computer software, data, or other computer-readable information. Examples of suitable removable storage units include a floppy disk, a magnetic tape, an optical disk, a flash memory device, or the like. Storage device 850 may also include other similar structures or devices for allowing computer software, data, or other computer-readable instructions to be loaded into computing system 800. For example, storage device 850 may be configured to read and write software, data, or other computer-readable information. Storage device 850 may also be a part of computing system 800 or may be separate devices accessed through other interface systems.

Many other devices or subsystems may be connected to computing system 800. Conversely, all of the components and devices illustrated in FIG. 8 need not be present to practice the embodiments described and/or illustrated herein. The devices and subsystems referenced above may also be interconnected in different ways from that shown in FIG. 8. Computing system 800 may also employ any number of software, firmware, and/or hardware configurations. For example, one or more of the embodiments disclosed herein may be encoded as a computer program (also referred to as computer software, software applications, computer-readable instructions, or computer control logic) on a computer-readable storage medium. Examples of computer-readable storage media include magnetic-storage media (e.g., hard disk drives and floppy disks), optical-storage media (e.g., CD- or DVD-ROMs), electronic-storage media (e.g., solid-state drives and flash media), and the like. Such computer programs can also be transferred to computing system 800 for storage in memory via a network such as the Internet or upon a carrier medium.

The computer-readable medium containing the computer program may be loaded into computing system 800. All or a portion of the computer program stored on the computer-readable medium may then be stored in storage device 850 (e.g., local storage device 135). When executed by processor 855, a computer program loaded into computing system 800 may cause processor 855 to perform and/or be a means for performing the functions of one or more of the embodiments described herein. Alternatively, one or more of the embodiments described and/or illustrated herein may be implemented in firmware and/or hardware. For example, computing system 800 may be configured as an application specific integrated circuit (ASIC) adapted to implement one or more of the embodiments disclosed herein.

Example Networking Environment

Figure 9:
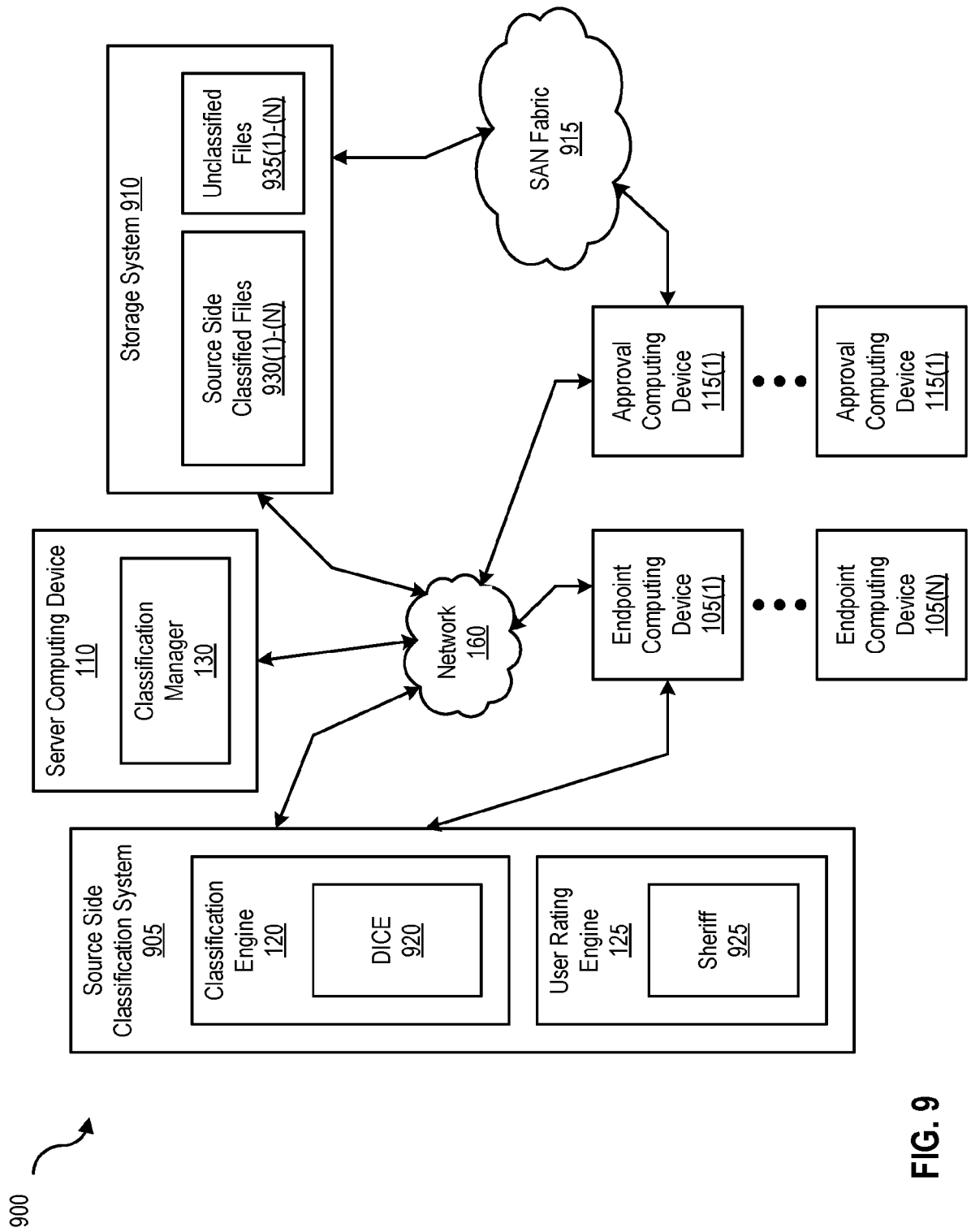
FIG. 9 is a block diagram 900 of a networked system, according to one embodiment of the present disclosure.

FIG. 9 is a block diagram of a networked system, illustrating how various computing devices can communicate via a network, according to one embodiment. In certain embodiments, network-attached storage (NAS) devices may be configured to communicate with endpoint computing devices 105(1), approval computing devices 115(1)-(N), server computing device 110, and/or source side classification system 905 using Network File System (NFS), Server Message Block (SMB), or Common Internet File System (CIFS). Network 160 generally represents any type or form of computer network or architecture capable of facilitating communication between endpoint computing devices 105(1), approval computing devices 115(1)-(N), server computing device 110, and/or source side classification system 905.

In certain embodiments, a communication interface, such as communication interface 845 in FIG. 8, may be used to provide connectivity between endpoint computing devices 105(1), approval computing devices 115(1)-(N), server computing device 110, and/or source side classification system 905, and network 160. The embodiments described and/or illustrated herein are not limited to the Internet or any particular network-based environment. In some embodiments, network 185 can be a Storage Area Network (SAN). In other embodiments, classification engine 120 and/or user rating engine 125 may be part of endpoint computing devices 105(1)-(N), or may be separate. If separate, classification engine 120 and/or user rating engine 125 may be implemented in source side classification system 905, which may be communicatively coupled to endpoint computing devices 105(1)-(N) via network 160.

In one embodiment, all or a portion of one or more of the disclosed embodiments may be encoded as a computer program and loaded onto and executed by endpoint computing devices 105(1)-(N) and/or approval computing devices 115(1)-(N). All or a portion of one or more of the embodiments disclosed herein may also be encoded as a computer program, stored on storage system 910, and distributed over network 160.

In some examples, all or a portion of source side classification 905, endpoint computing devices 105(1)-(N), server computing device 110, and/or approval computing devices 115(1)-(N) may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In addition, one or more of the components described herein may transform data, physical devices, and/or representations of physical devices from one form to another. For example, classification engine 120 and/or user rating engine 125 may transform the behavior of endpoint computing devices 105(1)-(N) and/or approval computing devices 115(1)-(N), to perform distributed data classification.

Although the present disclosure has been described in connection with several embodiments, the disclosure is not intended to be limited to the specific forms set forth herein. On the contrary, it is intended to cover such alternatives, modifications, and equivalents as can be reasonably included within the scope of the disclosure as defined by the appended claims.

What is claimed is:

1. A computer-implemented method comprising:
intercepting a plurality of operating system calls at an endpoint computing device, wherein
the plurality of operating system calls are associated with a plurality of files edited by the endpoint computing device;
generating a file list at the endpoint computing device, wherein
the file list comprises information that identifies the plurality of files associated with the intercepted operating system calls;
communicating the file list from the endpoint computing device to an approval computing device;
determining, at the approval computing device, whether the plurality of files in the file list are to be classified by the endpoint computing device as files with restricted access or unrestricted access;
in response to the approval computing device determining that the plurality of files in the file list are to be classified at the endpoint computing device, communicating a file classification request from the approval computing device to the endpoint computing device, wherein the file classification request includes user benchmark data relating to file classification performance of a user of the endpoint computing device;

determining, at the endpoint computing device, whether the endpoint computing device is idle and whether execution of a classification operation by the endpoint computing device would increase a processing load imposed on the endpoint computing device beyond a threshold, wherein the classification operation is configured to allow classification of the one or more files; and in response to a determination that the endpoint computing device is idle and the classification operation will not increase the processing load imposed on the endpoint computing device beyond the threshold, classifying each of the plurality of files as confidential with restricted access or not confidential with unrestricted access by the endpoint computing device.

2. The computer-implemented method of claim 1, further comprising:

in response to determining that the classification operation will cause deterioration in performance of the endpoint computing device, and that the endpoint computing device is not idle inhibiting or delaying performance of the classification operation on the endpoint computing device.

3. The computer-implemented method of claim 1 wherein the determining whether the endpoint computing device is idle is based, at least in part, on a user history or a geolocation of the endpoint computing device.

4. The computer-implemented method of claim 1, wherein intercepting the one or more operating system calls comprises
  accessing a kernel of the operating system,
  monitoring a file system associated with the operating system,
  identifying one or more network events associated with the endpoint computing device, and
  identifying the one or more files.

5. The computer-implemented method of claim 1, wherein the benchmark data is associated with an employee level of the user of the endpoint computing device in an active directory, a peer of the user of the endpoint computing device in the active directory, a business unit of the user of the endpoint computing device, or a peer organization of the user of the endpoint computing device.

6. The computer-implemented method of claim 1, wherein the file classification request is generated by a file classification manager executing on a server computing device,
the file list comprising the one or more files is generated by a file classification engine executed by the endpoint computing device, and
the one or more files are temporarily stored on a local storage device or a memory associated with the endpoint computing device and permanently stored on a remote storage device.

7. A non-transitory computer readable storage medium comprising program instructions executable to perform a method comprising:

intercepting a plurality of operating system calls at an endpoint computing device, wherein
  the plurality of operating system calls are associated with a plurality of files edited by the endpoint computing device;
generating a file list at the endpoint computing device, wherein
  the file list comprises information that identifies the plurality of files associated with the intercepted operating system calls;
communicating the file list from the endpoint computing device to an approval computing device;

determining, at the approval computing device, whether the plurality of files in the file list are to be classified by the endpoint computing device as files with restricted access or unrestricted access;

in response to the approval computing device determining that the plurality of files in the file list are to be classified at the endpoint computing device, communicating a file classification request from the approval computing device to the endpoint computing device, wherein the file classification request includes user benchmark data relating to file classification performance of a user of the endpoint computing device;

determining, at the endpoint computing device, whether the endpoint computing device is idle and whether execution of a classification operation by the endpoint computing device would increase a processing load imposed on the endpoint computing device beyond a threshold, wherein the classification operation is configured to allow classification of the one or more files; and in response to a determination that the endpoint computing device is idle and the classification operation will not increase the processing load imposed on the endpoint computing device beyond the threshold, classifying each of the plurality of files as confidential with restricted access or not confidential with unrestricted access by the endpoint computing device.

8. The non-transitory computer readable storage medium of claim 7, wherein the method further comprises:

in response to determining that the classification operation will cause deterioration in performance of the endpoint computing device, and that the endpoint computing device is not idle inhibiting or delaying performance of the classification operation on the endpoint computing device.

9. The non-transitory computer readable storage medium of claim 7 wherein the determining whether the endpoint computing device is idle is based, at least in part, on a user history or a geolocation of the endpoint computing device.

10. The non-transitory computer readable storage medium of claim 7, wherein the intercepting the one or more operating system calls comprises:
  accessing a kernel of the operating system,
  monitoring a file system associated with the operating system,
  identifying one or more network events associated with the endpoint computing device, and
  identifying the one or more files.

11. The non-transitory computer readable storage medium of claim 7, wherein
  the benchmark data is associated with an employee level of the user of the endpoint computing device in an active directory, a peer of the user of the endpoint computing device in the active directory, a business unit of the user of the endpoint computing device, or a peer organization of the user of the endpoint computing device,
  the request to classify the one or more files is generated by a file classification manager executing on a server computing device,
  the file list comprising the one or more files is generated by a file classification engine executed by the endpoint computing device, and
  the one or more files are temporarily stored on a local storage device or a memory associated with the endpoint computing device and permanently stored on a remote storage device.

12. A system comprising:
one or more computing devices each including, one or more processors; and a memory coupled to the one or more processors, wherein the memory stores program instructions executable by the one or more processors of the one or more computing devices to perform alone, or in combination with other computing devices, a method comprising intercepting a plurality of operating system calls at an endpoint computing device, wherein the plurality of operating system calls are associated with a plurality of files edited by the endpoint computing device;

generating a file list at the endpoint computing device, wherein the file list comprises information that identifies the plurality of files associated with the intercepted operating system calls;

communicating the file list from the endpoint computing device to an approval computing device;

determining, at the approval computing device, whether the plurality of files in the file list are to be classified by the endpoint computing device as files with restricted access or unrestricted access;

in response to the approval computing device determining that the plurality of files in the file list are to be classified at the endpoint computing device, communicating a file classification request from the approval computing device to the endpoint computing device, wherein the file classification request includes user benchmark data relating to file classification performance of a user of the endpoint computing device;

determining, at the endpoint computing device, whether the endpoint computing device is idle and whether execution of a classification operation by the endpoint computing device would increase a processing load imposed on the endpoint computing device beyond a threshold, wherein the classification operation is configured to allow classification of the one or more files; and in response to a determination that the endpoint computing device is idle and the classification operation will not increase the processing load imposed on the endpoint computing device beyond the threshold, classifying each of the plurality of files as confidential with restricted access or not confidential with unrestricted access by the endpoint computing device.

13. The system of claim 12, wherein the method further comprises:

in response to determining that the classification operation will cause deterioration in performance of the endpoint computing device, and that the endpoint computing device is not idle inhibiting or delaying performance of the classification operation on the endpoint computing device.

14. The system of claim 12, wherein the determining whether the endpoint computing device is idle is based, at least in part, on a user history or a geolocation of the endpoint computing device.

15. The system of claim 12, wherein intercepting the one or more operating system calls comprises accessing a kernel of the operating system, monitoring a file system associated with the operating system, identifying one or more network events associated with the endpoint computing device, and identifying the one or more files.

16. The system of claim 12, wherein the benchmark data of the user of the endpoint computing device is associated with an employee level in an active directory, a peer of the user of the endpoint computing device in the active directory, a business unit of the user of the endpoint computing device, or a peer organization of the user of the endpoint computing device.

17. The system of claim 12, wherein the request to classify the one or more files is generated by a file classification manager executing on a server computing device, the file list comprising the one or more files is generated by a file classification engine executed by the endpoint computing device, and the one or more files are temporarily stored on a local storage device or a memory associated with the endpoint computing device and permanently stored on a remote storage device.

* * * * *